Figure 1:
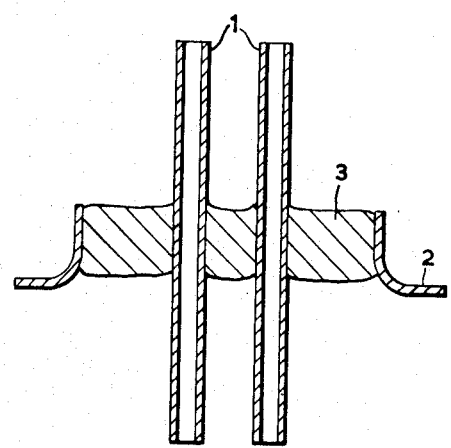

Nov. 30, 1965  P. W. McMILLAN ETAL  3,220,815
PROCESS OF BONDING GLASS OR CERAMIC TO METAL
Filed April 24, 1961

INVENTORS:
PETER WILLIAM McMILLAN
BRIAN PURDAM HODGSON
GRAHAM PARTRIDGE

Stevens, Davis, Miller & Mosher

Attorneys

3,220,815
PROCESS OF BONDING GLASS OR CERAMIC TO METAL
Peter William McMillan, Brian Purdam Hodgson, and Graham Partridge, Stafford, England, assignors to The English Electric Company Limited, London, England, a British company
Filed Apr. 24, 1961, Ser. No. 105,070
Claims priority, application Great Britain, May 2, 1960, 15,321/60
6 Claims. (Cl. 65—32)

This invention relates to bonding agents and processes and to bonded assemblies produced therewith. It has particular application to bonded assemblies in which a ceramic component comprising a body of devitrified glass is bonded to a metal component, as for example in a vacuum seal for an electric discharge device, and to bonding agents and processes for the production of such assemblies. The invention is also applicable to other types of bonded assemblies, for example those in which two ceramic components are to be bonded together, one of the components being a body of devitrified glass. Thus the detailed descriptions included in this specification of the bonding by the present invention of a glass component to a metal component are in general equally applicable to the bonding together of a glass component to a ceramic component, the glass component in either case being of a glass capable of controlled devitrification.

One object of the invention is the provision of a bonded assembly which can withstand relatively high processing or operating temperatures, including the seal, if any, between the two components. An important example occurs in the production of high vacuum discharge devices of composite ceramic-metal construction, which after assembly may require to be processed at temperatures of the order of 600° C. to ensure the release of occluded gases. Other examples occur in the production of devices of composite ceramic-metal constructions, whether or not for use at elevated temperatures, in which the ceramic parts are required to have exacting requirements of insulation, mechanical strength and dimensional stability.

One aspect of the present invention consists in the provision of a bonded assembly wherein a first component and a ceramic component are bonded together, with or without an interfacial layer consisting wholly or substantially of a devitrified glass, the ceramic component itself being a devitrified glass. The first component may be a metal component or a ceramic component.

The preferred process for providing an assembly of this form consists in first applying a thin layer of a glass capable of controlled devitrification to the surface of the first component at which a bonded joint is to be made. A body of a heat-sensitive glass, subsequently to become the ceramic component, is next united with the pre-glassed component, as by casting or pressing into intimate contact with the pre-glassed surface or otherwise sealing it to this surface by gas-flame or high-frequency sealing. Finally, this glass-metal or glass-ceramic assembly is subjected to a heat treatment to devitrify the glass, both of the glass body and of the pre-glassing layer, to provide a bonded ceramic-metal or ceramic-ceramic assembly.

The said glass may be any glass within a wide range of compositions which can be rendered suitable for controlled devitrification by the inclusion in the glass composition of a "nucleating agent," that is to say a material capable of providing within the glass a large number of dispersed colloidal particles to act as centres of initiating the subsequent crystallisation of the glass. Substances known to be suitable for use as nucleating agents include the phosphate anion (preferably introduced as a metallic phosphate); certain metallic fluorides; cadmium sulphoselenide; and metals such as gold, silver and copper.

Glasses at present known to be suitable for controlled devitrification by suitable heat treatment, when "seeded" with a nucleating agent, include:

(a) Glasses basically of the $Li_2O$-$MgO$-$Al_2O_3$-$SiO_2$ system, wherein the essential constituents, including the nucleating agent, form at least 90% by weight of the total composition and are present in the following proportions by weight:

|  | Percent |
|---|---|
| $Li_2O$ | 0–27 |
| $MgO$ | 0–32 |
| $Al_2O_3$ | 0–36 |
| $SiO_2$ | 45–88 |

The foregoing glass composition forms a part of the subject matter of a co-pending patent application of Peter William McMillan and Graham Partridge, Serial No. 42,808, filed July 14, 1960, now abandoned, and its continuation application Serial No. 365,619, filed May 7, 1964.

(b) Glasses basically of the $Li_2O$-$ZnO$-$SiO_2$ system wherein the essential constituents, including the nucleating agent, form at least 90% by weight of the total composition and are present in the following proportions by weight:

|  | Percent |
|---|---|
| $Li_2O$ | 2–27 |
| $ZnO$ | 10–59 |
| $SiO_2$ | 34–81 |

A preferred range of compositions within this system is as follows:

|  | Percent |
|---|---|
| $Li_2O$ | 7–25 |
| $ZnO$ | 10–30 |
| $SiO_2$ | 50–79 |

The foregoing glass composition forms the principal subject matter of a co-pending patent application Serial No. 90,414, now Patent No. 3,170,805.

In general it is thought that any of the nucleating agents already mentioned can be utilised in any glass within the foregoing ranges of compositions. It is however preferred to employ the phosphate anion as the nucleating agent, particularly in the form of a phosphate of a metal whose oxide forms a major constituent of the glass. The aforementioned co-pending patent applications define a suitable glass as being formed from a batch containing a phosphate in an amount such as to give in the finished product a quantity of the phosphate anion corresponding to 0.5 to 6.0% by weight of phosphorus pentoxide.

The present invention is not necessarily limited to the employment as bonding agents or ceramic bodies of glasses having the composition, or employing the nucleating agent, hereinbefore defined.

Suitable processes for carrying out that aspect of the invention which is concerned with providing a metal-ceramic assembly by first providing a metal-glass assembly and then devitrifying the glass component to ceramic form will now be considered in more detail.

In such metal-ceramic assemblies, heat-sensitive glass serves two purposes. Firstly, it provides a chemical bond with the metal component, by way of a metal oxide layer provided on the metal component and, secondly, it provides the ceramic component itself.

In some cases two heat sensitive glasses may be used, one to pre-glass the metal component and provide the chemical bond thereto and the other united to the first to form the ceramic component. In other cases one glass alone may serve both these purposes and is used to pre-glass the metal component in an initial operation and to form the ceramic component by a subsequent operation. In addition for certain designs of seals it is not necessary to pre-glass the metal component and in this case the heat sensitive glass subsequently to become the ceramic component, is united direct to the metal component during the moulding operation.

The glass used for the formation of the ceramic component should possess the following properties:

(a) The glass should be capable of forming continuous glass layers on the chosen metal at economic temperatures (in the region of 1000° C.), these layers being strongly adherent to the metal.

(b) The thin layers of glass should also be capable of devitrification under controlled heat-treatment to form microcrystalline and mechanically strong materials.

(c) Since the glass is of the form of a thin layer, it is not essential that the thermal expansion characteristics of the glass and metal should be very closely matched. However, it is considered necessary that the thermal expansion characteristics of the devitrified product and of the metal should be reasonably closely matched.

The glass used for the formation of the ceramic component should possess the following properties:

(a) The glass should be easily meltable and should be fairly fluid, so that on casting or pressing into contact with the metal component, the molten glass will easily come into intimate contact with the metal, and will also take on the desired shape imposed by the moulds. Also, if gas-flame or high-frequency sealing techniques are used, the glass should be capable of being shaped by conventional glass-forming techniques (casting, pressing, blowing or drawing).

(b) The linear thermal expansion characteristics of the resultant ceramic material should ideally be closely matched to that of the metal, in order to prevent fracturing of the ceramic by stresses set up on cooling from the final heat-treatment temperature. It is not necessary to match the thermal expansion characteristics of the glass before heat-treatment to that of the metal, since the glass is not allowed to cool below its annealing temperature after the sealing operation is completed and before it is converted to the ceramic form.

It is generally necessary, before the preparation of the metal-glass assembly, to apply a layer of heat-sensitive glass to the metal components. This layer of glass should be fairly uniform in thickness and free from bubbles and other defects. In addition, the pre-treatment of the metal and the method of applying the glass are such as to ensure that the glass-metal adhesion is strong. The means by which these conditions are achieved vary to a certain extent depending on the metal or alloy used. In general, the metal components are lightly sandblasted and then, in the case of certain alloys, such as "Nilo" (registered trade mark), series of nickel-iron alloys, the metals are decarburised. The "Nilo 48" alloy hereinafter referred to contains 48% nickel, balance iron plus normal impurities. The metals are degreased and are then pre-oxidised to develop on the surface of the metal a highly adherent oxide layer. In certain cases it is advantageous to apply a thin coating of another metal such as nickel or chromium to the metal component by conventional electroplating techniques before pre-oxidation and pre-glassing. The sealing faces of the pre-treated metal components are then coated with a uniform layer of powder glass by dipping the component into or spraying it with a suspension of the powder glass in methylated spirit. The metal components are then fired in an atmosphere of air or a protective atmosphere such as nitrogen or a nitrogen-hydrogen mixture to fuse the powder glass and to develop a smooth and uniform glass layer on the components.

The pre-glassed metal component is evenly pre-heated to a temperature ranging from 500° C. to 750° C., the actual temperature employed depending on the thickness of the metal. The metal component is then arranged as required in a pre-heated metal mould, which has previously been coated with a suitable parting agent, for example colloidal graphite. For certain designs of seals in which the size of the metal components is small, it is necessary to continue pre-heating the components in the mould until just before the introduction of the molten glass. In addition, for some types of seals, it is possible to design the mould so that the entire pre-heating cycle of the metal components is carried out with them positioned in the mould in the correct relationship to each other. It should be pointed out that in all cases it is essential that the metal component is at a sufficiently high temperature during contact with the molten glass to permit good "wetting" of the metal or pre-glassed metal component by the molten glass. The molten glass is then introduced into the mould and pressed, if so required, to attain the desired shape. It is important that the glass should be fluid enough to fill all parts of the mould necessary and to come into intimate contact with the sealing surface of the metal component.

The completed metal-glass assembly is allowed to cool in the mould until the glass is sufficiently rigid to resist deformation. In general at this stage during cooling, it has been found necessary to apply gentle heat to the metal component, usually by means of suitably positioned gas burners, to prevent the metal component acting as a heat radiator and preferentially cooling the glass adjacent to it below the strain point of the glass. The assembly is then removed from the mould and transferred to a muffle furnace which is maintained at a temperature above the lower annealing temperature of the glass and generally in the region of its dilatometic softening temperature. The assembly is placed inside a gas-tight enclosure in the furnace through which a flow of a suitable gas, such as nitrogen, "forming-gas" (90% nitrogen–10% hydrogen) or other insert or reducing gases, is passing.

The gas-tight enclosure is closed and the assembly is heat-treated, to devitrify the glass, in the manner described below. Seal assemblies not incorporating a metal component are in general heat treated in air.

An alternative method of manufacturing the metal-glass assembly is to prepare the heat-sensitive glass component by normal glass working procedures such as casting, pressing, blowing or drawing. The glass component is held in a suitable jig and pre-heated to a temperature above the annealing temperature and below the dilatometric softening temperature of the glass to prevent cracking of the glass due to thermal stressing. The glass component is then sealed to the pre-glassed metal component by the application of localised heat in the region of the seal from a gas flame or by a high frequency sealing technique. The completed assembly is then transferred to the gas-tight enclosure in the furnace, as described above, for heat-treatment to devitrify the glass.

The glass-metal assembly is heat-treated in an atmosphere of nitrogen, "forming-gas" or other suitable gas in order to prevent excessive oxidation of the metal components. The assembly is heat-treated to a carefully controlled schedule. In general, the heat-treatment schedule is as follows:

(a) The temperature is maintained at a first holding temperature, which is generally in the region of the dilatometric softening temperature of the glass, for a period of at least 15 minutes and preferably for one hour.

(b) The temperature is raised at a rate not exceeding 10° C. per minute, and preferably at a rate between 2 and 3° C. per minute, to a second holding temperature, which is generally in the range of 700° C. to 900° C., depending on the glass composition.

(c) The temperature is maintained at the above temperature for at least 15 minutes and preferably for one hour, to complete the devitrification of the glass.

(d) The assembly is allowed to cool to room temperature at a suitable rate to prevent fracture of the ceramic part due to thermal stressing. For small seals this cooling rate can be as high as 10° C. per minute.

It should be stressed that the heat-treatment schedules for certain materials are extremely critical, particularly as regards the final temperature, since even slight variations in this temperature can appreciably affect the thermal expansion characteristics of the resultant ceramic material.

In order to illustrate the various stages of practical processes which provide for the considerations discussed above, a number of further examples will now be described in detail.

EXAMPLE 1

Ceramic-metal seal assemblies have been prepared with a metal component of copper. The copper component was first pre-oxidised by raising the temperature to 900° C. in an atmosphere of nitrogen, and then admitting air for a period of 30 seconds. The copper component was allowed to cool in an atmosphere of nitrogen to less than 200° C. before removal. The component was then pre-glassed with Glass G.4, which has the weight percentage composition shown in Table I, the pre-glassed copper being fired at a temperature of 925° C. for 5 minutes in an atmosphere of "oxygen-free" nitrogen. Glass G.3, which has the composition shown in Table I, was cast or pressed around the copper component, which had been pre-heated to a temperature of 500–800° C. The glass-metal assembly was placed in a furnace maintained at 500° C. and was heat-treated to a schedule as given above, using holding temperatures of 500° C. and 850° C. the heat-treatment being carried out in an atmosphere of oxygen-free nitrogen.

The thermal expansion characteristics of the various materials used are as follows:

|  | Thermal expansion coefficient (20–400° C.) | Dilatometric softening temperature, ° C. |
| --- | --- | --- |
| Copper | 182.2×10⁻⁷ |  |
| Glass G.4 | 99.5×10⁻⁷ | 470 |
| Glass G.4 devitrified | 142×10⁻⁷ | 750 |
| Glass G.3 | 82.2×10⁻⁷ | 525 |
| Glass G.3 devitrified | 162.5×10⁻⁷ | 975 |

EXAMPLE 2

Ceramic-metal seal assemblies have been prepared with a metal component of mesmeric steel. The mesmeric steel component was first pre-oxidized by heating at a temperature of 800° C. for 5 minutes in air. The mesmeric steel was then pre-glassed with Glass G.4, or Glass G.5, which have the eight percentage compositions given in Table I, the pre-glassed mesmeric steel being fired at a temperature of 950° C. for 5 minutes in an atmosphere of "oxygen-free" nitrogen. Glass G.3 was cast or pressed around the mesmeric steel component which had been pre-heated to a temperature of 500–800° C. The glass-metal assembly was placed in a furnace maintained at 500° C. and was heat-treated, using holding temperatures of 500° C. and 850° C., in an atmosphere of "forming-gas" employing the schedule given above.

The thermal expansion characteristics of the various materials used are as follows:

|  | Thermal expansion coefficient (20–400° C.) | Dilatometric softening temperature, ° C. |
| --- | --- | --- |
| Mesmeric steel | 140×10⁻⁷ |  |
| Glass G.4 | 99.5×10⁻⁷ | 470 |
| Glass G.4 devitrified | 142×10⁻⁷ | 750 |
| Glass G.5 | 103.4×10⁻⁷ | 470 |
| Glass G.5 devitrified | 135.4×10⁻⁷ | 735 |
| Glass G.3 | 82.2×10⁻⁷ | 525 |
| Glass G.3 devitrified | 162.5×10⁻⁷ | 975 |

It should be pointed out that the final heat-treatment used in Examples 1 and 2 is very critical as slight changes in the heat-treatment of Glass G.3 have a large effect on the thermal expansion characteristics of the devitrified product.

EXAMPLE 3

Mesmeric steel components were pre-glassed with either Glass G.4 and Glass G.5 as in Example 2. Glass G.1 was cast or pressed around the mesmeric stell component which had been preheated to temperatures of 500–800° C. and was heat-treated, using holding temperatures of 480° C and 850° C. in an atmosphere of "forming-gas."

The thermal expansion characteristics of the various materials used are as follows:

|  | Thermal expansion coefficient (20–400° C.) | Dilatometric softening temperature, ° C. |
| --- | --- | --- |
| Mesmeric steel | 140×10⁻⁷ |  |
| Glass G.1 | 85.4×10⁻⁷ | 475 |
| Glass G.1 devitrified | 120.2×10⁻⁷ | 850 |

EXAMPLE 4

Ceramic-metal assemblies have also been prepared with a metal component of nickel-iron alloy, "Nilo (registered trade mark) 48." In this particular case, the Nilo 48 components were not pre-glassed but were pre-oxidised by heating in air at a temperature of 800° C. for 10 minutes. Glass G.2 was cast or pressed around a Nilo 48 component which had been pre-heated to a temperature of 500–800° C. The glass-metal assembly was placed in a furnace maintained at 500° C. and was heat-treated using holding temperatures of 500° C. and 850° C., in an atmosphere of "forming-gas."

The thermal expansion characteristics of the various materials are as follows:

|  | Thermal expansion coefficient (20–400° C.) | Dilatometric softening temperature, ° C. |
| --- | --- | --- |
| "Nilo (Regd. Trademark) 48" | 81.8×10⁻⁷ |  |
| Glass G.2 | 122×10⁻⁷ | 500 |
| Glass G.2 devitrified | 97.5×10⁻⁷ | 850 |

EXAMPLE 5

Nilo 48 components were pre-oxidised as in Example 4. Glass G.6 was cast or pressed around a Nilo 48 component which had been pre-heated to a temperature of 500–800° C. The glass-metal assembly was placed in a furnace maintained at 485° C. and was heat-treated, using holding temperatures of 485° C. and 800° C. in an atmosphere of air.

The thermal expansion coefficients of the various materials are as follows:

|  | Thermal expansion coefficient (20–400° C.) | Dilatometric softening temperature, ° C. |
| --- | --- | --- |
| "Nilo (Regd. Trademark) 48" | 81.8×10⁻⁷ |  |
| Glass G.6 | 114.0×10⁻⁷ | 485 |
| Glass G.6 devitrified | 92.0×10⁻⁷ | 835 |

The processes described herein can be applied in the manufacture of devices of the following general types:

(a) In the manufacture of vacuum seals which can withstand high operating or processing temperatures, such as may be experienced in the vacuum bake-out of the vacuum envelope. Examples of such applications are in the manufacture of mercury arc rectifiers and rectifiers of the semi-conductor type. Many other applications in vacuum tube construction will be apparent.

(b) In the manufacture of hermetic or oil-tight bushings. Such devices are required in the manufacture of transformers and other devices.

(c) In applications where it is necessary to fix electrical conductors in a precise and stable relationship with one another. Such applications would include commutators, multi-point switches, plugs and sprockets and so on.

(d) In the encapsulation of windings or conductors in order to obtain mechanical rigidity.

(e) In the production of ceramic insulators provided with metal fixing studs or collars sealed to or embedded in the ceramic. This would lead to improvements over present techniques in which metal fixing devices have to be cemented or otherwise joined to the ceramic.

Specific examples of the manufacture of seals of various different designs, the form of which seals is selected by way of example only, will now be described in detail in the three further examples below and with reference to the three figures of the accompanying drawings.

EXAMPLE 6

FIG. 1 shows a particular design of ceramic-metal seal assembly in which the metal component is copper and the ceramic component is formed from a thermally devitrifiable glass. The assembly consists of a circular flanged copper pressing 2 of 2.25 inches I.D. which encloses and is sealed to a disc of devitrified Glass 3, which has two copper tubes 1 of 0.25 inch O.D., 0.187 inch I.D. and 3 inches long, sealed through it.

The copper pressings and tubes were first degreased in acetone and then etched for one minute in 38% v./v. nitric acid. The copper components were then pre-oxidised by heating in an atmosphere of nitrogen for one minute at 830° C.–850° C., followed by natural cooling in air. The pre-oxidised components were then coated on their sealing faces with a thin layer of powder Glass A (Table II), by dipping them into a suspension of the powder glass in methylated spirit. The powder glassed pressings were fired in an atmosphere of nitrogen at 850° C. for 3 minutes to fuse the powder glass while the tubes were similarly fired for 2 minutes.

A pre-glassed copper pressing and two pre-glassed copper tubes were then supported in the correct relationship to each other in a mould which was rotated inside a ring burner until the temperature of the copper components had reached 700° C. to 750° C. The correct amount of molten Glass B (Table II) at a temperature of 1300° C. was then cast into the pressing and around the tubes to form the seal assembly which was allowed to cool until the temperature of the glass had reached about 550° C. At this stage the seal was removed from the mould and transferred to a gas-tight liner in which an atmosphere of nitrogen was maintained. The temperature in the liner at this point was 500° C. The seals were then heat-treated according to the following schedule to convert the glass to a devitrified glass-ceramic:

(a) The temperature of liner was held at 500° C. for one hour after the introduction of the seal.

(b) At the end of this time, the temperature was raised to 850° C. at 3° C. per minute and maintained at 850° C. for one hour.

(c) The seals were then cooled at 3° C. per minute to 650° C. and thereafter at the natural cooling rate of the furnace (less than 3° C. per minute).

The seal assemblies were removed from the liner at a temperature of about 30° C. Seals of this type are used to provide lead-ins through vacuum envelopes.

EXAMPLE 7

Figure 3:
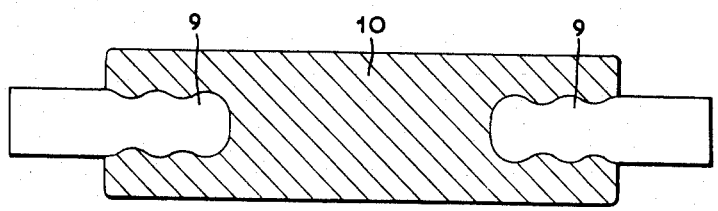

FIG. 3 shows a particular design of post insulator which has been made according to this invention. The ceramic component 10 is formed from a thermally devitrifiable glass and the sealed-in metal studs 9 are of mild steel. The studs 9 are 1.75 inches long by 0.5 inch diameter and these are sealed in the ceramic to a depth of 1.0 inch. The ceramic body of the insulator is 1.125 inches diameter by 4 inches long.

The metal studs were lightly sandblasted initially and then pre-oxidised in air at 500° C. for 5 minutes. The metal studs were then powder glassed on their sealing surfaces by dipping using a suspension of powder Glass C (Table II) in methylated spirit. The studs were fired for 8 minutes at 950° C. In forming gas (10% hydrogen +90% nitrogen) to fuse the powder glass.

The pre-glassed studs were pre-heated to 500° C. and then one positioned in the base of a pre-heated cast iron mould and one positioned in the mould plunger. Preheating of the studs by means of gas flames was continued with the studs held in the above positions until their temperature reached approximately 700° C. A charge of Glass D (Table II) was then introduced into the mould holding one of the studs. The mould plunger was then lowered to press the second stud into the molten glass and to form the shape.

The metal-glass assembly was allowed to cool to a temperature of approximately 550° C. before removing it from the mould and transferring to a furnace held at 480° C. in which an atmosphere of forming gas was maintained. The seals were then heat-treated according to the following schedule to convert the glass to a devitrified glass ceramic:

(a) The temperature of the furnace was held at 480° C. for one hour after the introduction of the seal.

(b) At the end of this time, the temperature was raised to 800° C. at 3° C. per minute and maintained at 800° C. for one hour.

(c) The seals were then cooled from 800° C. to 750° C. at 1° C. per minute and the temperature maintained at 750° C. for 2 hours.

(d) At the end of this time, the temperature was lowered to 650° C. at less than 2° C. per minute and then at less than 5° C. per minute to room temperature.

Machining operations, such as threading, can be carried out on the metal studs after the sealing operation. Devices of this type are used for high voltage insulation.

EXAMPLE 8

Figure 2:
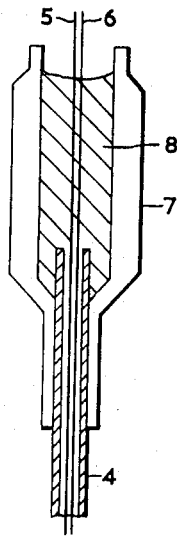

FIG. 2 shows a seal made according to this invention in the termination of a metal sheathed thermocouple. A thermocouple cable sheath 4 of stainless steel encloses nickel-chromium and nickel-aluminum conductors 5 and 6 respectively, of 24 S.W.G. embedded in tightly compressed magnesia. A small stainless steel sealing pot 7, 1 inch long by 3/16 inch I.D., is crimped onto the sheath at the end remote from the hot junction of the thermocouple. To prevent the ingress of water, it is normal to form a seal within this pot using organic materials, but for certain applications a high temperature seal is required and thermally devitrifiable glasses 8 have been found satisfactory for this.

Seals of the above type have been prepared using Glass A (Table II). A small diameter tube of this glass was initially prepared by drawing. The tube was cut into short lengths 1/4 inch to 3/8 inch long. Seals were then made by placing lengths of glass tube in the sealing pots, so that the glass tubes were sleeved over the two wires. The glass was then melted down in the sealing pots in the flame of a hand torch to give seals as shown in FIG. 2. These were allowed to cool naturally to room temperature.

The seals in the terminations of the thermocouples were then heat treated as follows in an atmosphere of nitrogen to convert the glass to a devitrified glass ceramic:

(a) The temperature was raised to 480° C. at 5° C. per minute and held at this temperature for one hour.

(b) At the end of this time, the temperature was raised at 2–3° C. per minute to 725° C. and this temperature was maintained for one hour.

(c) The seals were then allowed to cool to room temperature at up to 10° C. per minute.

Tests have shown such seals to be gas-tight and moisture proof after thermal cycling between room temperature and 450° C.

*Table I*

[Weight percentage composition of the glasses used and their melting temperatures]

| Glass No. | G.1 | G.2 | G.3 | G.4 | G.5 | G.6 |
|---|---|---|---|---|---|---|
| Constituents, weight percent: | | | | | | |
| $SiO_2$ | 78.1 | 71.4 | 60.2 | 54.2 | 54.2 | 63.5 |
| $Li_2O$ | 12.0 | 17.7 | 10.0 | 9.0 | 9.0 | 18.5 |
| $K_2O$ | 2.5 | | | | | 3.6 |
| $Na_2O$ | | | | 5.0 | 5.0 | |
| $MgO$ | | | 8.0 | | | 3.8 |
| $Al_2O_3$ | | | | | | 7.7 |
| $ZnO$ | 5.5 | | 27.1 | 24.4 | 24.4 | |
| $CaO$ | | | | | 2.5 | |
| $B_2O_3$ | | | | 5.0 | 2.5 | |
| $P_2O_5$ | 1.9 | 2.9 | 2.7 | 2.4 | 2.4 | 2.9 |
| Melting temperature, ° C | 1,400 | 1,300 | 1,300 | 1,250 | 1,250 | 1,300 |

*Table II*

[Weight percentage compositions of thermally devitrifiable glasses referred to in the detailed examples]

| | Glass A | Glass B | Glass C | Glass D |
|---|---|---|---|---|
| $SiO_2$ | 54.2 | 59.2 | 53.7 | 78.1 |
| $Li_2O$ | 9.0 | 9.0 | 9.0 | 12.0 |
| $Na_2O$ | 5.0 | | 5.0 | |
| $K_2O$ | | 2.0 | | 2.5 |
| $ZnO$ | 24.4 | 27.1 | 24.4 | 5.5 |
| $B_2O_3$ | 5.0 | | 5.0 | |
| $P_2O_5$ | 2.4 | 2.7 | 2.4 | 1.9 |
| $NiO$ | | | 0.25 | |
| $CoO$ | | | 0.25 | |
| Glass: Melting temperature, ° C | 1,250 | 1,300 | 1,250 | 1,400 |
| Glass-ceramic material: Thermal expansion coefficient$\times 10^7$ cm./cm./° C. for range 20° C. to 400° C. | 142 | 168 | 142 | 120 |
| Dilatometric softening temperature, ° C | 750 | 900 | 750 | 850 |

N.B.—Glass A and Glass D correspond with Glasses G.4 and G.1 respectively of Table I and are repeated here for completeness.

What we claim is:

1. A process for forming a seal between a metal component and a glass component which comprises (1) forming an oxide film on said metal component, (2) coating said metal oxide film with an adherent layer of glass capable of controlled devitrification, (3) applying molten glass capable of controlled devitrification to said adherent layer of glass to form said glass component, (4) cooling said molten glass in contact with said adherent layer of glass to a temperature at which the glass is rigid but which is above the strain point of said glass, (5) treating the resulting assembly in a non-oxidizing atmosphere at a temperature above the lower annealing temperature but not in excess of the dilatometric turnover temperature of said glass in its devitrified form to devitrify said glass, and (6) cooling the resulting metal-devitrified glass assembly slowly to room temperature to avoid thermal stresses therein.

2. A process according to claim 1 in which the first component is made of copper.

3. A process according to claim 1 in which the first component is steel.

4. A process according to claim 1 in which the metal component is made of nickel-iron alloy.

5. A process according to claim 1 in which the metal component is made of stainless steel.

6. A process for forming a seal between a metal component and a glass component which comprises (1) forming an adherent oxide film on said metal component, (2) applying molten glass capable of controlled devitrification to said adherent layer of oxide to form said glass component, (3) cooling said molten glass in contact with said adherent layer of oxide to a temperature at which the glass is rigid but which is above the strain point of said glass, (4) treating the resulting assembly in a nonoxidizing atmosphere at a temperature above the lower annealing temperature but not in excess of the dilatometric turnover temperature of said glass in its devitrified form to devitrify said glass, and (5) cooling the resulting metal-devitrified glass assembly slowly to room temperature to avoid thermal stresses therein.

References Cited by the Examiner

UNITED STATES PATENTS

| | | | |
|---|---|---|---|
| 2,193,640 | 3/1940 | Navias | 161—196 |
| 2,239,551 | 4/1941 | Dalton. | |
| 2,279,168 | 4/1942 | Kalischer. | |
| 2,458,748 | 1/1949 | Stupakoff | 161—196 |
| 2,669,808 | 2/1954 | Duncan et al | 161—225 |
| 2,743,553 | 1/1956 | Armistead | 161—196 |
| 2,889,952 | 6/1959 | Claypoole. | |
| 2,951,167 | 8/1960 | Kegg et al | 161—196 |
| 3,035,372 | 5/1962 | Mayers | 161—196 |
| 3,040,213 | 6/1962 | Buyer et al. | |
| 3,063,198 | 11/1962 | Babcock | 161—193 |

FOREIGN PATENTS 556,982   5/1958   Belgium.

ALEXANDER WYMAN, *Primary Examiner.*

IVAN R. LADY, EARL M. BERGERT, *Examiners.*